A. PETERSON & W. H. DONAHUE.
WRENCH.
APPLICATION FILED FEB. 13, 1915.
1,191,822. Patented July 18, 1916.
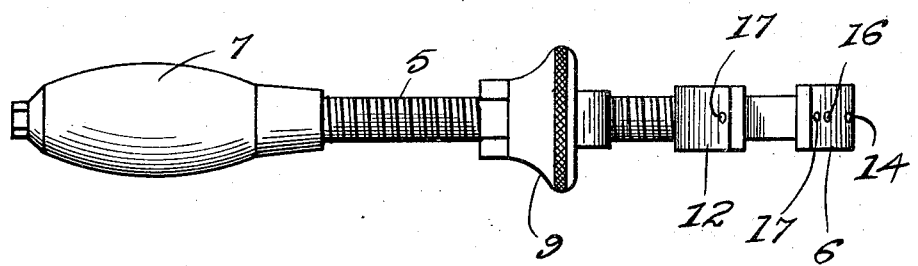
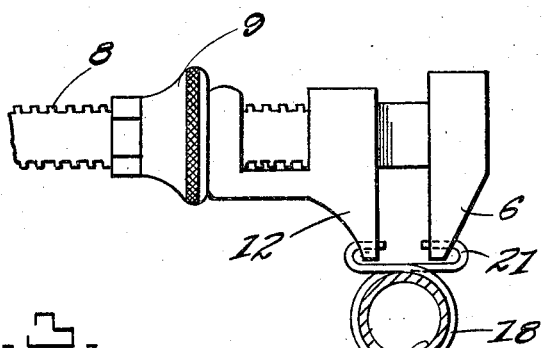
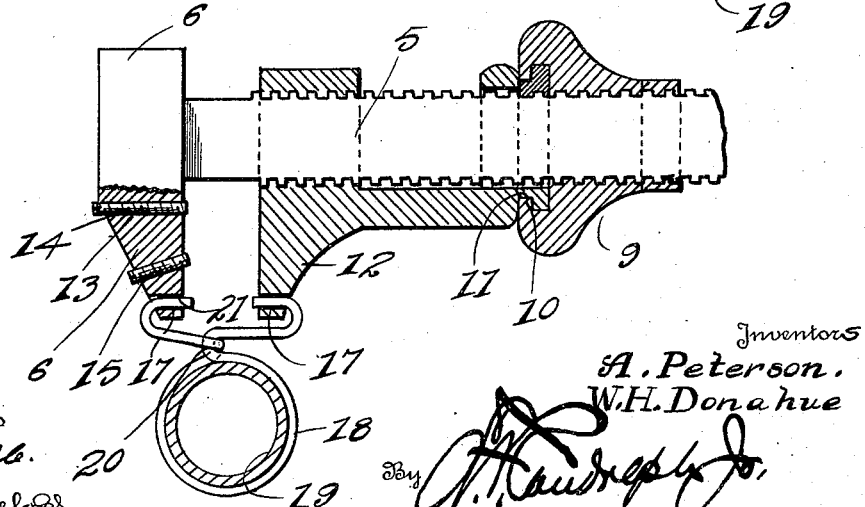

UNITED STATES PATENT OFFICE.

ALBERT PETERSON, OF CHICAGO, ILLINOIS, AND WILLIAM H. DONAHUE, OF WHITING, INDIANA; SAID DONAHUE ASSIGNOR TO SAID PETERSON.

WRENCH.

1,191,822. Specification of Letters Patent. Patented July 18, 1916.

Application filed February 13, 1915. Serial No. 7,990.

*To all whom it may concern:*

Be it known that we, (1) ALBERT PETERSON and (2) WILLIAM H. DONAHUE, citizens of the United States, residing at (1) Chicago and (2) Whiting, in the counties of (1) Cook and (2) Lake, and States of (1) Illinois and (2) Indiana, have invented certain new and useful Improvements in Wrenches; and we do hereby declare the following to be a full, clear, and exact description of the invention, such as will enable others skilled in the art to which it appertains to make and use the same.

This invention has for its object to provide a wrench of novel and efficient construction embodying relatively stationary and adjustable jaws each having an aperture therein adapted to receive a strand of wire for twisting the ends of the latter about a pipe or other object.

Another object of the invention is the provision of a wrench having screws or equivalent means in the relatively stationary jaw adapted to be adjusted to engage and clamp a pipe or other cylindrical object.

With these and other objects in view, the invention consists in the novel construction, arrangement and formation of parts as will be hereinafter specifically described, claimed and illustrated in the accompanying drawing, in which:

Figure 1 represents an edge elevation of the wrench. Fig. 2 represents a top plan view thereof, partly broken away, showing the wrench applied to use, and Fig. 3 represents an enlarged detail view, partly in section, of the head of the wrench.

Referring to the drawing in detail wherein similar reference numerals designate corresponding parts throughout the several views, the numeral 5 indicates a relatively flat body or shank carrying a relatively stationary or rigid jaw 6 at one end and a handle 7 at the opposite end. The longitudinal edges of the shank 5 are provided with screwthreads 8 on which is fitted a nut 9 having an inwardly directed flange 10 seated in a groove or recess 11 in the relatively adjustable jaw 12, whereby when the nut 9 is advanced upon the threads 8 the adjustable jaw 12 is moved longitudinally upon the shank 5.

The stationary jaw 6 is formed with a transverse screwthreaded bore 13 extending parallel with the shank 5 and adjustably receiving a screw 14 adapted to be adjusted so as to project inwardly of the object-engaging face of the jaw 6 to reliably clamp a pipe or other cylindrical object. A second screwthreaded bore 15 is formed through the jaw 6 outwardly of the bore 13 and at an angle thereto and adjustably receives a screw 16. The screw 16 is adapted to be adjusted to clamp relatively large cylindrical objects to secure them against rotation between the jaws 6 and 12.

Adjacent their outer extremities the jaws 6 and 12 are formed with alined transverse openings 17 adapted to receive the ends of a strand of wire 18 for securing or looping the latter about a pipe or other cylindrical object 19, as clearly illustrated in Fig. 3.

In use, a strand of wire 18 is looped about a pipe 19 and is twisted one or more times, as indicated at 20, by hand, as illustrated in Fig. 2. The free ends 21 of the wire are subsequently bent back into a U-shaped formation as illustrated in Fig. 3 and the extreme ends thereof are moved inwardly or together to engage within the apertures or openings 17 in the jaws 6 and 12. The relatively adjustable jaw 12 is subsequently moved away from the relatively stationary jaw 6 by rotating the nut 9 so as to draw upon the ends 21 of the wire strand. The wrench is subsequently rotated so as to twist the looped portion of the wire 18 tightly about the object 19.

What we claim is:

A wrench comprising a shank having screws on the longitudinal edges thereof; a handle secured upon one end of said shank; a relatively stationary jaw rigidly secured to the opposite end of said shank; a relatively adjustable jaw; means for adjusting said jaws longitudinally of said shank; said relatively stationary jaw having a screwthreaded bore extending parallel with said shank and adjacent the latter and a second screwthreaded bore extending at an angle to the first mentioned bore, and clamping screws adjustably positioned in said bores and adapted to extend beyond the inner face of said jaw thereby converting said nut receiving jaws into pipe gripping jaws.

In testimony whereof we affix our signatures in presence of two witnesses.

ALBERT PETERSON.
WILLIAM H. DONAHUE.

Witnesses:
 JOHN J. GERBA,
 FRED J. SMITH.